United States Patent [19]
Kammiller et al.

[11] Patent Number: 5,619,405
[45] Date of Patent: Apr. 8, 1997

[54] VARIABLE BANDWITH CONTROL FOR POWER FACTOR CORRECTION

[75] Inventors: Neil A. Kammiller; Zissis L. Kalivas, both of Lorain, Ohio

[73] Assignee: Reltec Corporation, Lorain, Ohio

[21] Appl. No.: 576,620

[22] Filed: Dec. 21, 1995

[51] Int. Cl.[6] ................................................. H02M 7/155
[52] U.S. Cl. ...................... 363/80; 363/81; 363/89; 323/222
[58] Field of Search ........................ 363/79, 80, 81, 363/84, 89, 126; 323/205, 207, 222, 285

[56] References Cited

U.S. PATENT DOCUMENTS

| | | | |
|---|---|---|---|
| 4,104,576 | 8/1978 | Frank | 323/102 |
| 4,430,625 | 2/1984 | Yakoyama | 330/297 |
| 4,554,502 | 11/1985 | Rohatyn | 323/208 |
| 4,645,997 | 2/1987 | Whited | 323/211 |
| 4,837,495 | 6/1989 | Zansky | 323/22 |
| 4,924,372 | 5/1990 | Fox et al. | 363/89 |
| 4,943,902 | 7/1990 | Severinsky | 363/80 |
| 4,974,141 | 11/1990 | Severinsky et al. | 363/81 |
| 5,001,620 | 3/1991 | Smith | 363/89 |
| 5,003,454 | 3/1991 | Bruning | 363/81 |
| 5,006,975 | 4/1991 | Neufeld | 363/80 |
| 5,019,952 | 5/1991 | Smolenski et al. | 363/16 |
| 5,113,337 | 5/1992 | Steigerwald | 363/98 |
| 5,349,284 | 9/1994 | Whittle | 323/207 |
| 5,359,277 | 10/1994 | Cowett, Jr. | 323/207 |
| 5,371,667 | 12/1994 | Nakao et al. | 363/124 |
| 5,383,109 | 1/1995 | Maksimovic et al. | 323/222 |
| 5,404,093 | 4/1995 | Cowett, Jr. | 323/207 |
| 5,406,192 | 4/1995 | Vinciarelli | 323/222 |
| 5,436,550 | 7/1995 | Arakawa | 323/222 |
| 5,459,392 | 10/1995 | Mandelcorn | 323/222 |
| 5,532,918 | 7/1996 | Mayrand et al. | 363/89 |

*Primary Examiner*—Peter S. Wong
*Assistant Examiner*—Adolf Berhane
*Attorney, Agent, or Firm*—Fay Sharpe Beall Fagan Minnich & McKee

[57] ABSTRACT

A regulated power supply having power factor correction control which includes a state variable integrator/error amplifier that provides a low distortion error signal during steady state operation and fast transient response for tight output voltage control.

8 Claims, 5 Drawing Sheets

VARIABLE BANDWITH CONTROL FOR POWER FACTOR CORRECTION

BACKGROUND OF THE INVENTION

This invention pertains to the art of power supplies and more particularly to regulated constant output voltage sinusoidal input current power supplies.

The invention maintains output voltage constant and input current sinusoidal during both slow varying changes in the output load and large fast transient load steps and load dumps, through automatic responses within the power factor correction section of the regulated power supply, and will be described with particular reference thereto. It will be appreciated, however, that the invention has broader applications that may be advantageously employed in other environments and applications that impose similar constraints.

Power supplies including regulated power supplies are in widespread use in a variety of environments including supplying power in the telecommunication industry. In this, as well as other industries where significant load changes are common and maintaining low input current distortion is important; regulated power supplies which eliminate distortion are desirable. Therefore, such regulated power supplies include power factor correction which virtually eliminates input current distortion allowing steady undistorted input currents to be generated. Another requirement for such regulated power supplies is that they respond to fast transient changes in the load so that the regulated power supply output is maintained within a predetermined acceptable operating range. Unfortunately, obtaining low signal distortion and fast response to load changes are two diametrically opposed goals when implemented in regulated power supplies. The characteristics to ensure low signal distortion act against providing proper response to fast large load changes. For a regulated power supply to generate a low distortion signal, a very low bandwidth amplifier is needed in the power factor correction section of the power supply. Such a low bandwidth amplifier filters out AC component ripple existing on an output bank capacitor of the regulated power supply. This filtered signal works to eliminate unwanted distortions. However, by using such a low bandwidth amplifier, when a large fast load change occurs at the output of the regulated power supply it is not possible for the power factor correction section to respond in a manner to keep the output voltage within predetermined limits.

While power factor correction configured to provide low distortion will react to load changes, it will react very slowly, so that by the time a new load level is reached, either high or low voltage protection alarms will be reached, and the power supply will shut down.

On the otherhand, if, instead of low signal distortion, a circuit for proper transient response were desired, a large bandwidth or fast reacting power factor correction would be desirable. In such a situation, the regulated power supply will react quickly to load changes quickly bringing the output voltage within desirable parameters. In this situation, when fast load changes occur, the likelihood of the output voltage reaching alarm limits can be avoided.

Previous systems have addressed these issues by attempting to provide compromises between the opposed goals. One such system exemplified in U.S. Pat. No. 5,006,975 to Neufeld uses a sample and hold configuration. However, a drawback of such a system is that after the sample is taken the power supply is forced to use that sample for at least ½ cycle, or for a 60 Hertz system for approximately 8 milliseconds. Therefore, depending upon the ability of the power supply to maintain its output voltage for 8 ms, which is based upon the amount of energy stored in its output capacitance, the output voltage could be out of the desired range within this time period.

Other systems attempting to address these conflicting goals make compromises in the selection of components for the output voltage control circuit of the regulated power supply. However, by implementing such compromises, optimum performance in distortion, output voltage regulation and transient response cannot be achieved simultaneously.

Power factor correction is desirable in an off-line regulated power supply since it works to minimize wasted energy. If a distorted wave shape is present in the distribution wiring, there will be less usable power at the output for a given current. Another problem which exists with poor power factor is especially relevant to three-phase systems. In a balanced undistorted three-phase system the neutral wire will normally carry a minimum current. In an unbalanced or distorted system such as one with poor power factor, the neutral becomes a high-current carrier, increasing the chances of damage such as by fire.

Further, when power factor correction is provided in a power supply, the smooth sinewave input as shown in FIG. 1A can be obtained. However, a circuit without power factor correction can generate a highly distorted wave form which generates bursts of currents as illustrated in FIG. 1B. Such a wave form generates large amounts of heat that is wasted energy. Further, if there is a weak generating system, such as an inverter or engine generator, the input current will flattop the power line voltage as shown in FIG. 1C.

It has, therefore, been deemed desirable to design a power supply with power factor correction that eliminates the compromises and tradeoffs of prior systems and which achieves the goals of low input current distortion and good transient response. Further, the power correction circuitry should be easily implemented into known power supply configurations in an economical manner. Still further, the power factor correction will automatically adjust its operation dependent upon whether slowly varying load changes or large fast transient load changes occur at the output.

SUMMARY OF THE INVENTION

The present invention contemplates a new and improved power supply that overcomes all of the above-noted problems and others, provides a low distortion input and quick response to large fast load changes, by increasing its control bandwidth when load changes occur, automatically providing a smaller bandwidth during normal operation.

According to a more limited aspect of the invention, the power factor correction includes an error amplifier whose operation is automatically adjusted based on a sensed output voltage value of the power supply. The error amplifier including at least two input resistances which may be switched in and out of the error amplifier circuit dependent upon signals from high and low reference analog voltage comparators. The resistances and voltage comparators are connected in such a manner that when a predetermined high or low voltage output value is sensed, a switching element connects a lower resistance value to the input of the error amplifier thereby speeding up the response of the error amplifier. The lower resistance is disconnected when the analog voltage comparators sense a voltage within a predetermined range. Thereafter, the higher resistance value is reestablished at the input of the error amplifier, lowering the bandwidth and therefore speed of response of the error amplifier.

According to yet another embodiment of the subject invention, in place of the switching element and associated resistance, a variable resistance configuration is used. The variable resistance configuration is controlled to vary the bandwidth and therefore speed of the error amplifier in a smoother manner than the on/off response used with the switching element.

A principal advantage of the invention is the provision of a regulated power supply having power factor correction that achieves both low input current distortion and appropriate transient response over a wide range of loads.

Another advantage of the invention resides in the ease with which it may be used in existing regulated power supply configurations.

Still other advantages and benefits of the invention will become apparent to those skilled in the art upon a reading and understanding of the following detailed description.

A BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1A:
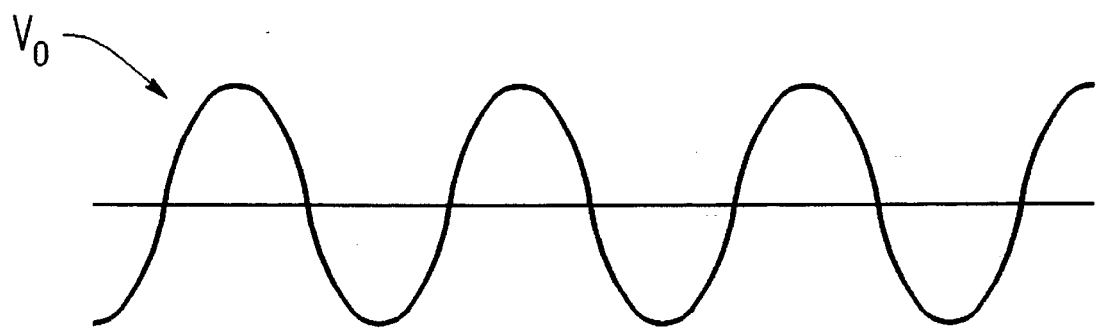
FIG. 1A illustrates a sine wave output voltage signal from a regulated power supply having power factor correction control.
Figure 1B:
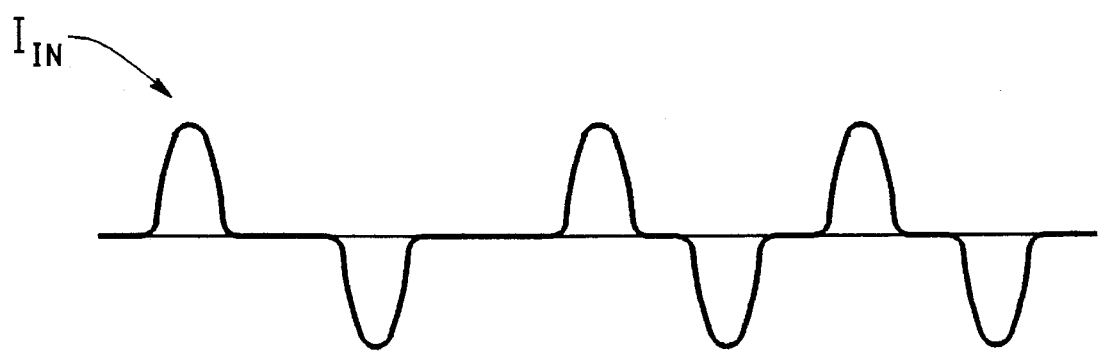
FIG. 1B is a current input signal of a power supply not having power factor correction.
Figure 1C:
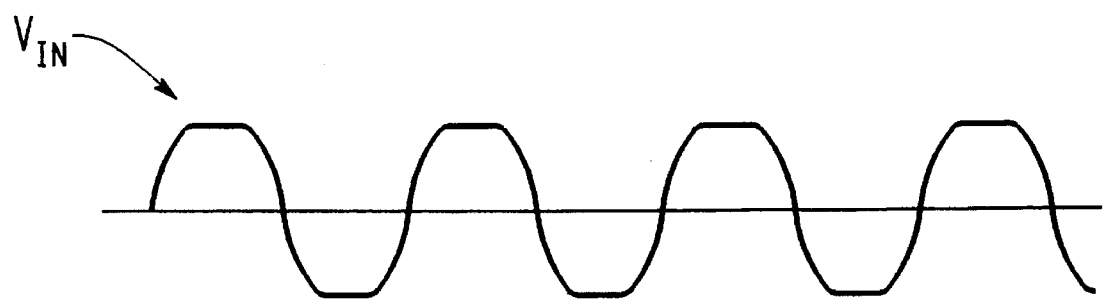
FIG. 1C is an input voltage response to current from a power supply not having power factor correction.
Figure 2:
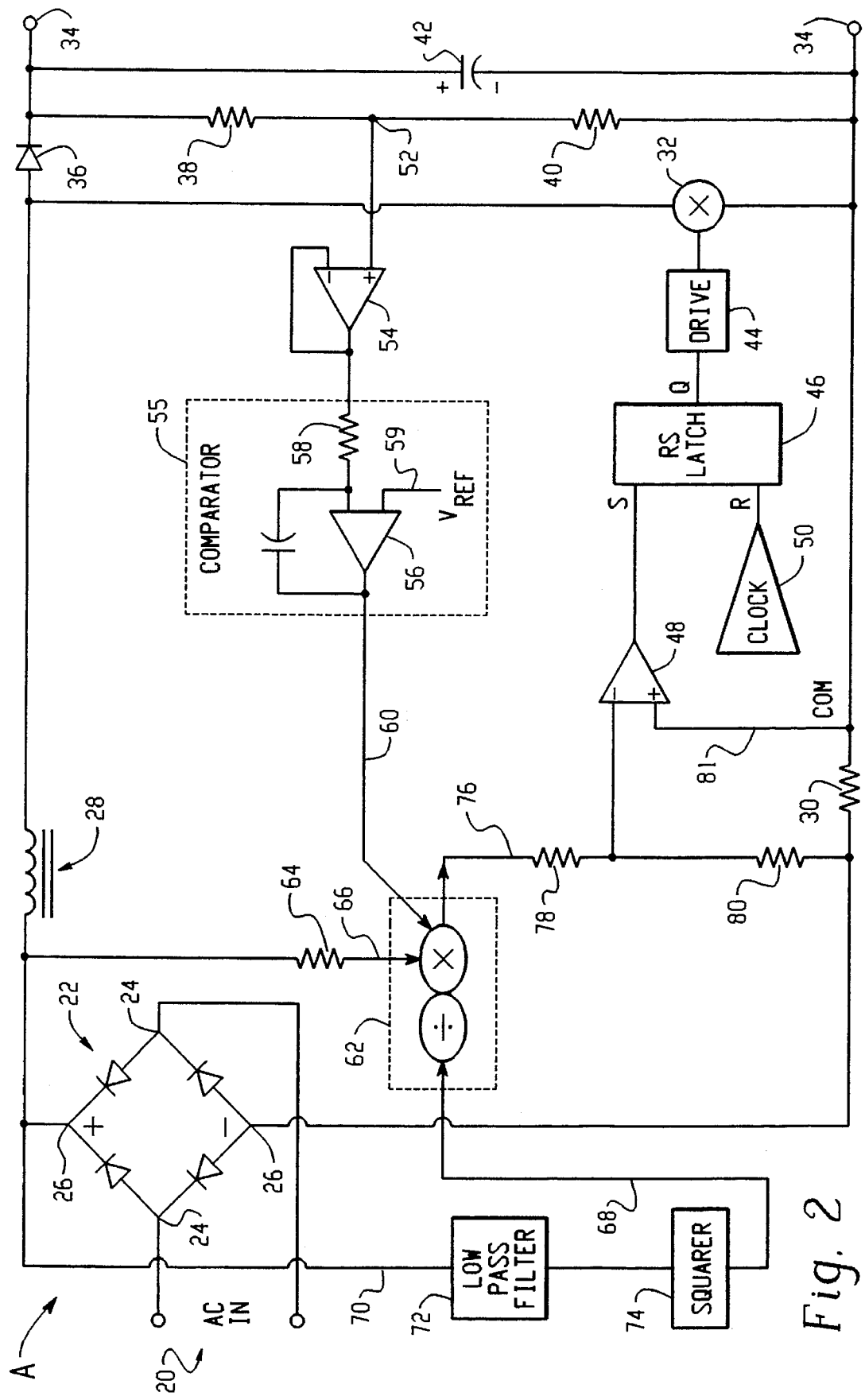
FIG. 2 is a known regulated power supply with power factor correction.

Referring now to the drawings wherein the showings are for purposes of illustrating the preferred embodiment of the invention only and not for purposes of limiting same, FIG. 2 shows a block diagram for a regulated power supply A with power factor correction. In this circuit, an AC input signal 20 is received by a rectifier such as diode bridge rectifier 22 at AC inputs 24. Outputs 26 of the bridge rectifier 22 are passed through inductor 28 and a current sense resistor 30 to switch 32. Switch 32 may be various components including a FET switch or other type of known switching device.

At predetermined controlled times, switch 32 is made conductive and the voltage from rectifier 22 is applied to inductor 28. The current in inductor 28 increases. Then switch 32 is made non-conductive and the current in inductor 28 flows through diode 36 charging capacitor 42. Capacitor 42 is charged as above and discharged by the load across terminals 34. Diode 36 keeps capacitor 42 from discharging through switch 32 when it is conductive. The controlled conducting/non-conducting timers of switch 32 maintains a constant voltage at terminals 34. It is to be appreciated that while the output in this embodiment is 385 volts, other constant voltage outputs are possible.

Switch 32 is driven by drive circuit 44 which in turn receives its input from a control device such as RS latch 46. The inputs to RS latch 46 are shown in this embodiment to be from current comparator 48 and clock 50 which generates a clock signal operating at approximately 100 KHz. The operation of these elements is known in the art and, therefore, does not need to be discussed in greater detail.

In this embodiment a sample of the output voltage is sensed at voltage divider location 52 and provided to a buffer amplifier 54. The sensed output voltage used by buffer 54 may be of any value, but in this example is chosen to be approximately 7.5 volts. Buffer amplifier 54 is used to avoid loading the high impedance divider network formed by resistors 38 and 40.

The output of buffer 54 is provided to comparator block 55 which includes error amplifier 56. The output of buffer 54 is provided to an input error amplifier 56 through resistor 58. It is to be appreciated that error amplifier 56 may also be called an integrator, comparator, voltage comparator, voltage error amplifier, limited bandwidth amplifier, or other terms known in the art.

The sample signal from voltage divider point 52 is compared in error amplifier 56 with reference voltage 59. This comparison operation produces a voltage error signal 60 which is supplied to multiplier/divider block 62. In addition to receiving the voltage error signal 60, multiplier/divider block 62 also receives, through resistor 64, a line shape current 66 having the same shape as the input voltage and which represents the line current shape of power supply A. Also provided to multiplier/divider block 62 is a magnitude input 68 which is a DC level that is related to the RMS value of the line voltage, which varies. Magnitude input 68 is a rectified line value 70 which is passed through a low pass filter 72 and through squarer 74 to obtain a DC level representative of the square of line voltage.

The three inputs, voltage error signal 60, line shape current 66, and magnitude input 68 are combined within multiplier/divider block 62 and converted to a current in resistor 78 to form input current 76 which is the reference signal for comparator 48 and, which is applied to the inverter input of comparator 48 thru resistor 78. The input current 76 is compared with line input current 79 which develops a voltage across resistor 30, which is converted to a current in resistor 80 and applied to the inverter input of comparator 48. The other input of comparator 48 is tied to common 81. The control loop formed by 38, 40, 52, 54, 60, 62, 76, 78, 80, 30, 48, 81 maintains the voltage at 78, 80 junction at the level of circuit common 81.

As previously noted, the output of current comparator 48, clock 50, RS latch 46, and drive 44 are operated to control switch 32 to thereby provide a desired output voltage across output 34.

In the power supply A illustrated in FIG. 2, it is desired to maintain a constant output voltage, such as 385 volts. This output voltage is to be a substantially DC non-distorted output signal. However, terminals 34 are across capacitive element 42 which is charged by a current having a large 120 Hz component, therefore the voltage sensed at voltage divider 52 will have a 120 Hz AC ripple component. If this AC component is included as part of voltage error signal 60 and passed to multiplier/divider block 62, then input current 76 will contain the undesirable distortion component in the waveshape across 42. In order to avoid this, voltage error signal 60 needs to be made as close to a DC level as possible. Therefore, comparator block 55 is made to operate at a very low bandwidth and as a result has a very slow response to load changes.

The DC voltage error signal 60 will be a constant DC voltage signal of different values, for different loads or input conditions. By providing a very low bandwidth in the comparator block 55, the AC component of the sampled voltage from voltage divider point 52 will be blocked, thereby providing the substantially DC voltage error signal 60 to multiplier 62. It is to be noted that no distortion is input by the line shape current 66 or the magnitude input 68.

A problem which exists, however, with the regulated power supply of FIG. 2 is that, when a large fast load change occurs at output 34, the comparator block 55 is too slow to follow the change. When such a fast load step occurs, it is desirable to respond quickly by raising or lowering the output current with a minimum change in output voltage. The desired reaction of the comparator block 55 would be to respond by increasing its speed of response, i.e., enlarging its bandwidth, to move rapidly to the new voltage output level required.

Figure 3:
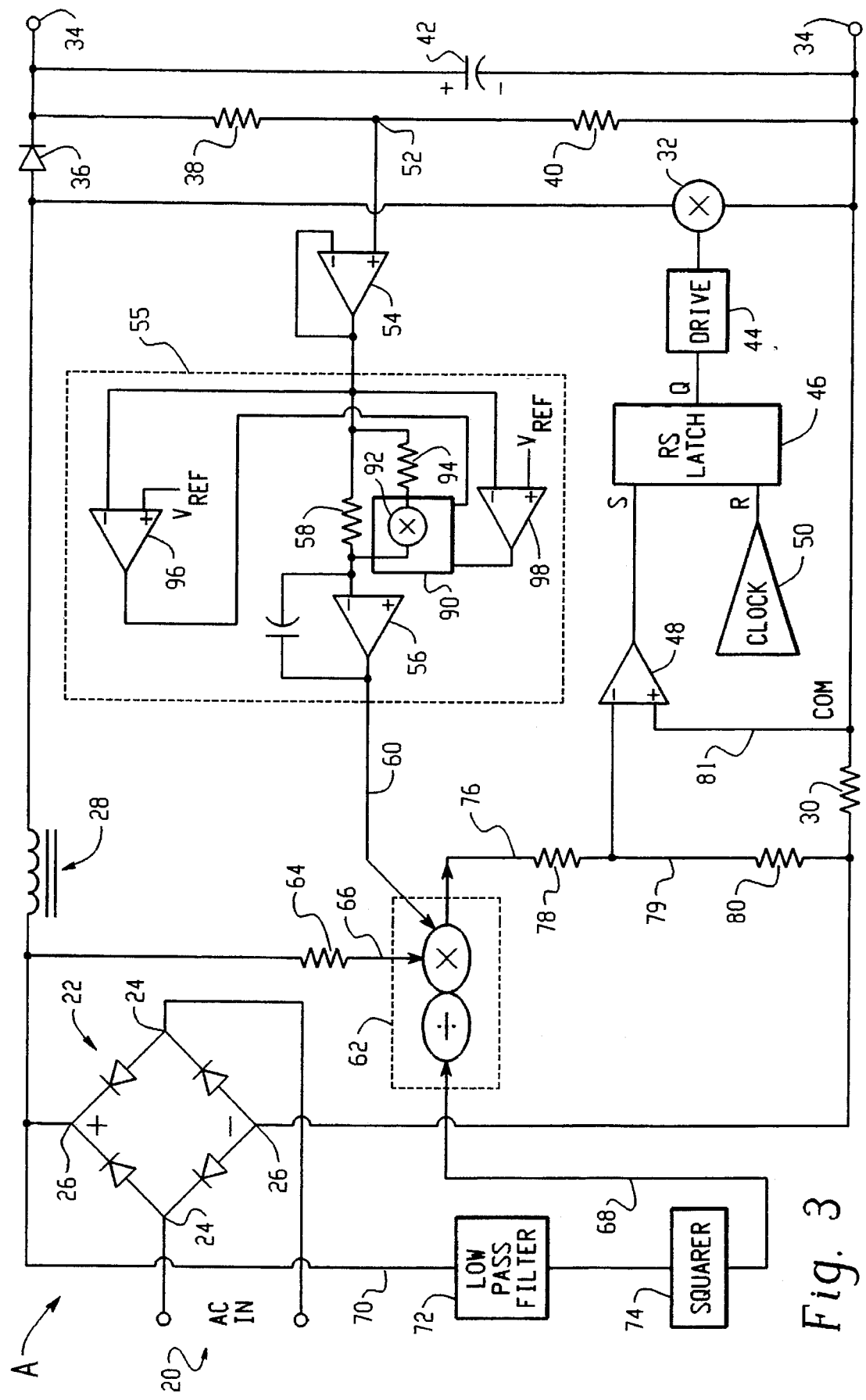
FIG. 3 is a regulated power supply using the power factor control circuitry according to the subject invention.

Therefore, with attention to a power supply having both the capability of low distortion and quick response to load changes according to the subject invention, attention is directed to FIG. 3. In FIG. 3, components similar to those in FIG. 2 are numbered similarly.

During steady state operation, the circuit operates in a manner similar to that described above. However, with attention to the comparator block 55, additional elements are provided so that the power factor control of the regulated power supply A is capable of providing both low distortion and a quick response time to fast large load changes. When the power supply A is operating within acceptable output voltage parameters comparator block 55 has a low bandwidth, thereby operating in a slow manner. When a large fast transient change occurs at the load causing the output voltage to exceed the acceptable parameters, operation of the comparator block will switch to a very fast high bandwidth.

Comparator block 55 continues its use of error amplifier 56 with input resistance 58 during steady state operation when there are no fast large load changes occurring. Added in this embodiment, however, is switching element 90, including switch 92, and resistance 94 which is placed at an input of error amplifier 56 during fast transient load changes. Also provided is high reference analog voltage comparator 96 and low reference analog voltage comparator 98.

As previously noted, voltage error signal 60, line shape 64, and magnitude input 68 are combined in multiplier/divider 62 to generate input current 76 which is the reference for input current waveshape and amplitude and is used as an input to current comparator 48. It has also been noted that it is desirable to essentially eliminate or minimize AC signal components from the reference signal supplied to current comparator 48. If not essentially eliminated or minimized, this AC distortion will be duplicated in the line current waveshape in resistor 30. Therefore, comparator block 55 is used to filter out AC distortion so as to provide voltage error signal 60 as a substantially smooth DC signal. To make error amplifier 56 a slow changing, integrating device a comparatively large resistance 58, approximately 5,000 ohms, is proved such that error amplifier 56 has a very narrow bandwidth. The bandwidth of error amplifier 56 is desired to be below the frequency of the input power and in this embodiment may be in a range as low as from zero to a fraction of a hertz. By configuring error amplifier 56 in this manner, substantially no AC ripple is allowed to pass through the comparator block 55 as a superimposed signal on the voltage error signal 60.

As previously discussed, however, it is common for power supplies used in the communication industry, as well as other industries, to have loads that will have large fast transient changes. During these transient periods the very slow comparator block 55 of FIG. 2 is not able to maintain the constant voltage output as desired, and therefore the regulated voltage supply is forced into a non-regulated state until a recovery occurs.

In the present invention when a quick change in the load occurs, comparator block 55 of FIG. 3 acts to provide a fast response to maintain the voltage output within acceptable parameters. This is accomplished by causing comparator block 55 to increase its bandwidth/speed to account for the large load change and move the power factor control section so as to be responsive to the new load level. The present invention speeds up the operation by increasing the bandwidth of error amplifier 56. This is accomplished by the high reference analog voltage comparator 96 and the low reference analog voltage comparator 98 in conjunction with switch 92 of switching element 90 and resistance 94 of approximately 100 ohms.

Figure 4A:
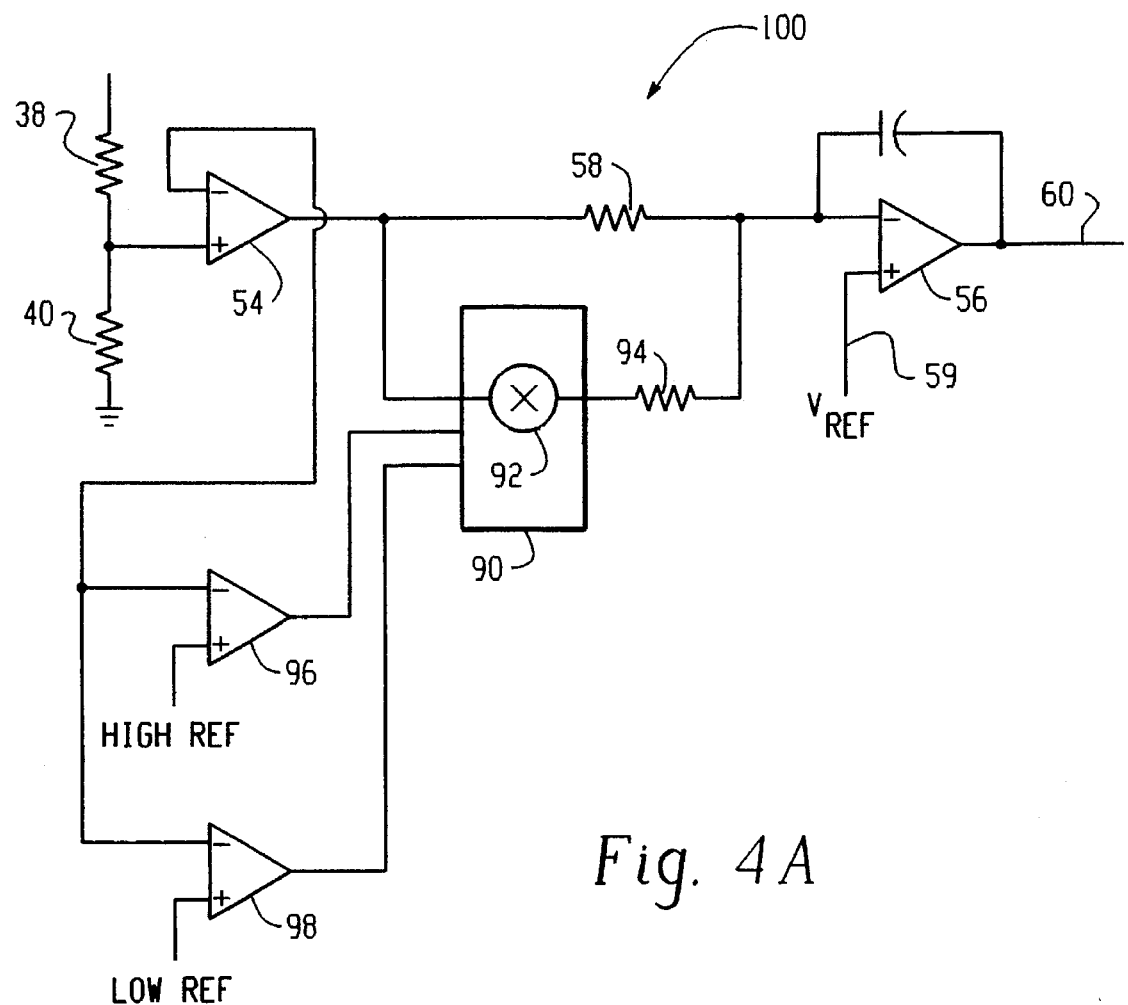
FIG. 4A is a more detailed view of the variable bandwidth control for power factor control according to the subject invention.

With particular attention to FIG. 4A which focuses more closely on variable bandwidth control 100 (of comparator block 55) for power factor correction control, high reference analog voltage comparator 96 has a reference voltage of 7.6 volts at one input with the other input receiving a sample voltage from output buffer 54. Low reference analog voltage comparator 98 has a reference voltage of 7.4 volts at one input and receives a sample voltage from the output of buffer 54.

When within a range from slightly less than 7.6 volts to slightly more than 7.4 volts, resistor 58, of approximately 5,000 ohms, is used as the input to error amplifier 56. In this situation, the regulated power supply is operating in a normal state, and the output of error amplifier 56 acts as a slow integrator suppressing any AC distortion on voltage error signal 60. When, however, a sudden load change occurs at output 34, a signal from buffer 54 which is either equal to or greater than 7.6 volts, or equal to or less than 7.4 volts may be sensed. When this occurs, switch 92 is activated, thereby placing resistor 94 in parallel with resistor 58 and essentially eliminating resistor 58 from the circuit. This transition provides a dramatic increase in the bandwidth and speed at which error amplifier 56 responds. By this action the error signal 60 will move quickly in order to maintain the output voltage at approximately 385 volts.

By increasing the bandwidth during this time period, an increased amount of the AC ripple from voltage divider point 52 passes to multiplier/divider block 62 and therefore the remainder of the control circuit of the power supply. Once the power supply output is within an acceptable range, the signals provided by either of analog comparators 96 and 98 will be removed from switching element 90, opening switch 92, thereby removing resistor 94 from the input error amplifier 56. Removal of the resistor 94 will cause error amplifier 56 to again be a slow moving low bandwidth amplifier such that distortion is eliminated from the system. By this arrangement there will be a momentary distortion passed out of multiplier/divider block 62 to current comparator 48. Typically this distortion will be for such a short time period that it will not substantially impact the overall control of power supply A.

Ultimately, it is desired to maintain the 385 volt output, or other selected output, as constant as possible. It is possible to maintain power supply A at a very constant output by selecting the reference voltages of the high and low comparators 96 and 98 at appropriate values.

Figure 4B:
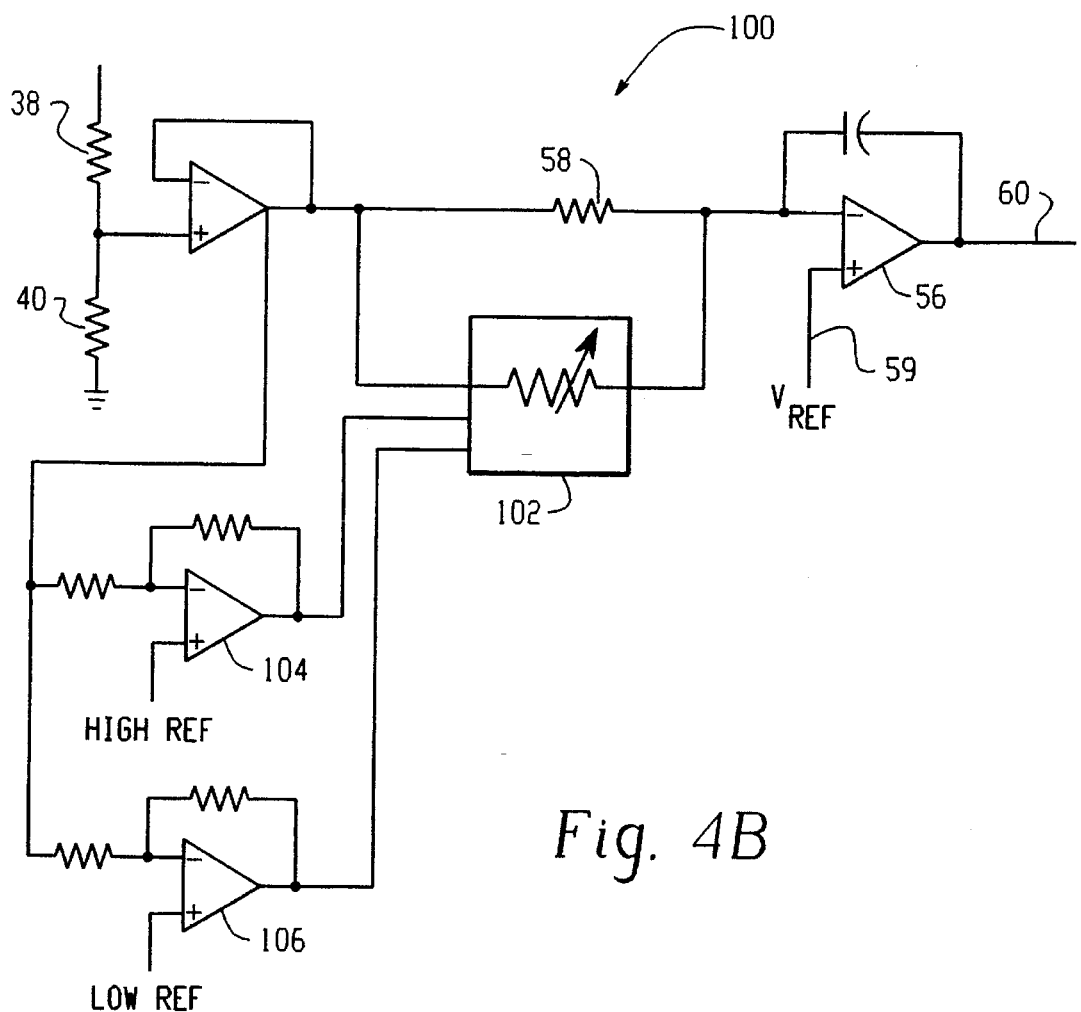
FIG. 4B is a more detailed view of another embodiment of the variable bandwidth control for power factor control according to the subject invention.

Turning attention to FIG. 4B, the variable bandwidth control 100 shown in FIG. 4A is changed by using a variable resistance device 102, such as a potentiometer, rheostat or other variable resistance device known in the art, whose insertion into error amplifier 56 is controlled by fixed gain amplifiers 104 and 106. The use of the variable resistance configuration allows for analog control of the bandwidth/speed at which the error amplifier operates. The manner of controlling the error amplifier to obtain this analog output would be known to those in the art and therefore further discussion as to such control is not believed necessary.

Figure 5:
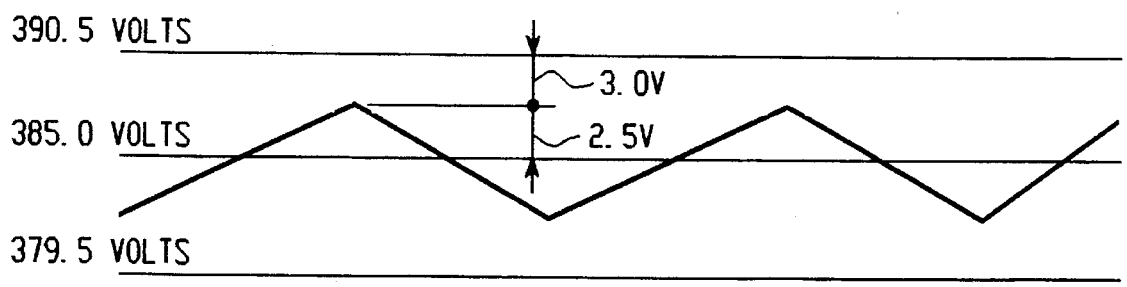
FIG. 5 shows wave forms output from the regulated power supply of FIG. 3.

An example of input waveforms in the present regulated output power supply may be seen in FIG. 5. It is assumed that there is output capacitor ripple of 5 volts sensed at voltage divider 52, and that a 3 volt margin is provided for the output voltage. With an ideal output of 385 volts, each side of ideal 385 volts will allow a ripple of 2½ volts plus the 3 volt margin so that the high acceptable output voltage level will be 390.5 volts and the low acceptable output voltage level will be 379.5 volts. Therefore, when the DC level increases 3 volts due to a load step, the high voltage comparator will be activated closing switch 92 and inserting resistance 94, thereby drastically increasing the speed of error amplifier 56 until the voltage is brought into an acceptable range.

With attention to circuit stability, using error amplifier 56 at a low bandwidth makes the circuit control loop unaffected by load parameters. Particularly, when bandwidth is at such a small value a negative resistance and/or any load capacitance value etc. can be attached and the power supply will maintain its stability under any load or line condition.

It is to be appreciated that the reference voltages for the analog reference voltage comparators 96 and 98 may be obtained internally of the power supply and divia down or up through resistor/divider combinations. It is also to be appreciated that switch 92 may be implemented as a parallel switch such that each of the analog comparators 96 and 98 will insert resistance 92 into the input of error amplifier 56.

In the subject circuit, it is desirable to maintain both a constant output voltage and to keep constant the shape of the input current being used in the-system. It is necessary to keep the line shape control signal accurate since no other signal coming into the multiplier/divider 62 contains information except for the line shape current 64, since the magnitude input 68, and the error signal 60 are essentially DC levels. Therefore, in the subject invention the error signal 60, line shape current signal 64, and DC magnitude signal 68 entering the multiplier/divider 62 generate an input current signal 76 which is a controlled amplitude shape signal influenced by error signal 60, and is distorted if error signal 60 is not at a substantially DC level.

While variable bandwidth control 100 has been shown used in conjunction with power supply A of FIG. 3, it is to be appreciated that control 100 can be used in power supplies with topologies different from that used in the present embodiment, including unregulated supplies.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A power supply having power factor control comprising:

an error amplifier having first and second inputs;

a first reference voltage from a voltage reference source supplied to the first input of the error amplifier;

a first resistance connected to the second input of the error amplifier;

a switch connected to a second resistance, and placed across the first resistance; and a voltage comparator connected to the switch which compares a second reference voltage to a sample voltage wherein when a predetermined value is output from the voltage comparator, the switch is closed placing the second resistance in parallel with the first resistance.

2. The power supply according to claim 1 wherein the sample voltage supplied to the comparator is further connected to be supplied to the first input of the error amplifier.

3. The power supply according to claim 1 wherein the voltage comparator includes a high reference voltage comparator and a low reference voltage comparator.

4. The power supply according to claim 1 wherein the reference voltage supplied to the high reference voltage comparator is distinct from the reference voltage supplied to the low reference voltage comparator.

5. The power supply according to claim 1 wherein the error amplifier has a bandwidth below the frequency of the input power when the first resistance alone is connected to the first input of the error amplifier.

6. The power supply according to claim 1 wherein the bandwidth of the error amplifier increases when the second resistance is switched to the first input of the error amplifier.

7. The power supply according to claim 1 wherein the bandwidth below the frequency of the input power is a bandwidth of zero to a fraction of a hertz.

8. A power supply having power factor control comprising:

an error amplifier having first and second inputs;

a first reference voltage from a voltage reference source supplied to the first input of the error amplifier;

a first resistance connected to the second input of the error amplifier;

a control device connected to a variable resistance, and placed across the first resistance; and a voltage comparator connected to the control device which compares a second reference voltage to a sample voltage wherein when a predetermined value is output from the voltage comparator, the control device operates to place proportional amounts of resistance of the variable resistance in parallel with the first resistance.

* * * * *